W. DAME.
Self-Lubricating Journal-Box.
No. 163,160.  Patented May 11, 1875.
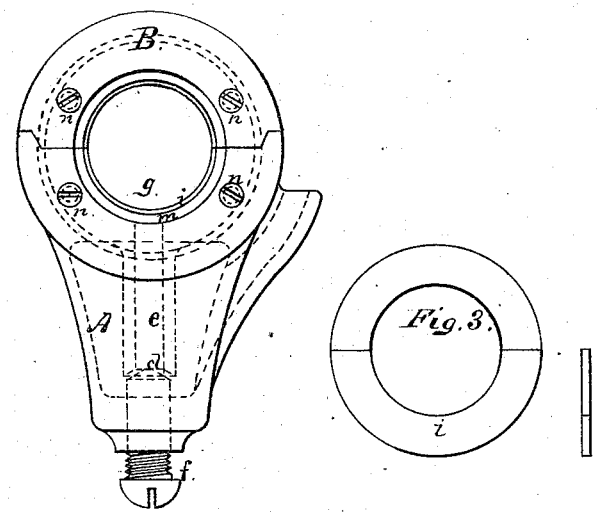
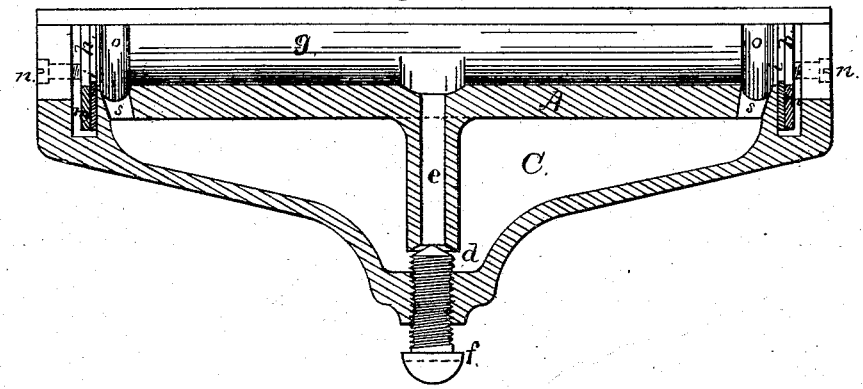
Witnesses:
F. J. Masi
Geo. E. Upham
Inventor,
William Dame
Chipman Hosmer & Co
Attorneys.

UNITED STATES PATENT OFFICE.

WILLIAM DAME, OF WOONSOCKET, RHODE ISLAND.

IMPROVEMENT IN SELF-LUBRICATING JOURNAL-BOXES.

Specification forming part of Letters Patent No. 163,160, dated May 11, 1875; application filed December 5, 1874.

*To all whom it may concern:*

Be it known that I, WILLIAM DAME, of Woonsocket, in the county of Providence and State of Rhode Island, have invented a new and valuable Improvement in Self-Lubricating Journal-Boxes; and I do hereby declare that the following is a full, clear, and exact description of the construction and operation of the same, reference being had to the annexed drawings, making a part of this specification, and to the letters and figures of reference marked thereon.

Figure 1 of the drawing is a representation of an end view of my journal-box, and Fig. 2 is a longitudinal sectional view of the same. Fig. 3 is a detail view.

This invention has relation to self-lubricating journal-boxes of the sectional kind. The object of the invention in this class of boxes is to prevent too free a flow of oil upon the journal, and thereby to remove a frequent cause of complaint, owing to the waste of the lubricating compound consequent upon its running out of the ends of the box. To this end the nature of the invention and improvement consists in combining with a sectional journal-box an adjustable screw having a beveled end fitting in the correspondingly-beveled end of a feed-tube leading from the oil-reservoir to the journal, whereby the flow of the oil upon the said journal may be regulated to suit various exigencies. It also consists in cut-offs or washers, of leather or other suitable materials, in combination with a clamp-plate, both being arranged in recesses, and held in place and compressed by suitable set-screws, whereby the washers may be clamped by tightening the screws, thereby producing at all times a tight joint, and preventing the escape of oil from the ends of the box, all as will be hereinafter more fully explained.

In the annexed drawings, A designates the lower section, and B the upper section or cap, of a journal-box, in connection with which I propose to exemplify my invention. C is the oil-reservoir, having a central feed-tube, $e$, which conveys oil from the said reservoir to a journal, $g$, and which extends nearly to its bottom, as shown in Fig. 2. The lower end of this tube is countersunk, and is adapted to receive the correspondingly-beveled upper end of a screw, $f$, passing through a suitable screw-threaded aperture in the bottom of the lower section A, thus forming a valve, $d$. By adjusting this screw the amount of oil admitted to the bearing may be increased or diminished at pleasure. $h$ designates annular recesses cut into the sections A B at each end of the bearing, in which are applied cut-offs or washers $i$, made of leather or other suitable material, cut to the size of the shaft, and closely conforming to the contour thereof. Outside of these cut-offs are placed clamp-plates $m$, of iron or other suitable metal, which are held in place by set-screws $n$ passing through threaded apertures through that portion of the box between the recess $h$ and the outside edge thereof. By setting up these screws the cut-offs $i$ may be forced against the inner wall of the recess $h$, thereby effectually preventing the escape of oil out of the ends of the journal-box, and necessitating its flow back into the reservoir, in the event that the valve $d$ should be opened to such an extent as to supply too much oil to the journal, through grooves $o$ inside of the said cut-offs, thus creating a great saving in lubricators, and preventing undue wear of the journals from the penetration of dust therein.

What I claim as new, and desire to secure by Letters Patent, is—

1. In a sectional journal-box, the combination, with an oil-reservoir, C, of the lower section of the feed-tube $e$, having a countersunk lower end, and the adjustable screw $f$, having a correspondingly-beveled upper end, substantially as specified.

2. The cut-offs or washers $i$ and the clamp-plates $m$, arranged in recesses $h$, and clamped by set-screws $n$, combined and arranged substantially as specified.

3. The combination of the oil-reservoir C, valve $d$, screw $f$, cut-offs $i$, with clamp-plates $m$, set-screws $n$, grooves $o$, with oil-holes $s$, substantially as and for the purpose described.

In testimony that I claim the above I have hereunto subscribed my name in the presence of two witnesses.

WILLIAM DAME.

Witnesses:
 GEORGE A. WILBUR,
 FRANCIS L. O'REILLY.